United States Patent [19]

Hagiri

[11] 4,376,476
[45] Mar. 15, 1983

[54] DRIVING CIRCUIT FOR MAGNETIC CLUTCHES FOR USE WITH REFRIGERANT COMPRESSORS

[75] Inventor: Tiichi Hagiri, Higashi-Matsuyama, Japan

[73] Assignee: Diesel Kiki Co. Ltd., Tokyo, Japan

[21] Appl. No.: 229,716

[22] Filed: Jan. 29, 1981

[30] Foreign Application Priority Data

Feb. 5, 1980 [JP] Japan ............................ 55-12548

[51] Int. Cl.³ .................... F16D 27/00; F16D 27/10; H01H 47/04
[52] U.S. Cl. .............................. 192/84 R; 192/84 C; 361/154
[58] Field of Search .................. 192/84 R, 84 C; 188/161; 361/154

[56] References Cited

U.S. PATENT DOCUMENTS

| 3,084,310 | 4/1963 | Schurr | 188/161 X |
| 3,116,441 | 12/1963 | Gieffers | 361/154 |
| 3,268,045 | 8/1966 | Poumakis | 361/154 X |
| 3,558,997 | 1/1971 | Derc | 188/161 X |

FOREIGN PATENT DOCUMENTS 513814 6/1955 Canada ............................ 188/161

Primary Examiner—Allan D. Herrmann
Attorney, Agent, or Firm—Frishauf, Holtz, Goodman & Woodward

[57] ABSTRACT

A driving circuit for a magnetic clutch for use with a refrigerant compressor, which comprises a time constant circuit, a first transistor disposed to conduct responsive to an output from the time constant circuit, a second transistor responsive to the conduction state of the first transistor to energize the magnetic coil of the magnetic clutch, and a limiting circuit for limiting the excitation of the magnetic coil through the second transistor in response to the conduction state of the first transistor. The magnetic coil is excited to an extent sufficient to cause engagement of the magnetic clutch during charging of the capacitor of the time constant circuit after energization of the time constant circuit. After saturation of the capacitor, the magnetic coil is excited to a lesser extent but sufficient to maintain the engagement of the magnetic clutch.

5 Claims, 7 Drawing Figures

4,376,476

DRIVING CIRCUIT FOR MAGNETIC CLUTCHES FOR USE WITH REFRIGERANT COMPRESSORS

BACKGROUND OF THE INVENTION

The present invention relates to a driving circuit for a magnetic clutch which operates to couple a refrigerant compressor used in an air conditioner for automotive vehicles, to a vehicle engine to allow transmission of torque from the latter to the former.

A refrigerant compressor, which is used in an air conditioner for automotive vehicles, is generally provided with a magnetic clutch which comprises a driving member such as a pulley which engages with a driver such as a vehicle engine, through a belt or the like, a clutch plate arranged close to a side surface of the driving member and secured to the main shaft of the compressor, and a magnetic coil arranged on the other side surface of the driving member, whereby energization of the magnetic coil causes frictional engagement of the clutch plate with the driving member to allow transmission of torque produced by the driver to the main shaft of the compressor.

In the above magnetic clutch, magnetomotive force or electromagnetic force, which is produced in the magnetic coil by electric current flowing therethrough, is always substantially constant, whereas torque, which is transmitted from the driving member to the clutch plate, is relatively large at the instant of engagement of the clutch and thereafter is relatively small. Therefore, a large amount of electromagnetic force is required at the instant of engagement of the clutch while just a small amount of electromagnetic force is sufficient for keeping the engagement of the clutch after the engagement of the clutch is completed. However, according to the conventional magnetic clutch, a larger amount of electric current than that required always flows through the magnetic coil during operation of the refrigerant compressor after engagement of the clutch, which results in early exhaustion of the battery used as the power source and thermal deterioration of the magnetic coil.

OBJECT AND SUMMARY OF THE INVENTION

It is therefore an object of the invention to provide a driving circuit for magnetic clutches which is capable of automatically controlling the magnitude of electric current flowing through the magnetic coil in such a manner that the current is set at a large value on engagement of the clutch and is constantly kept at a small value after the engagement of the clutch, to thereby prevent the waste of electric power to be consumed by the magnetic clutch.

According to the invention, there is provided a driving circuit for a magnetic clutch for use with a refrigerant compressor, which comprises: a starting switch connected to a power source; a series circuit comprising a resistance and a capacitor and having a predetermined time constant, said resistance and capacitor being arranged to be energized upon closing of said starting switch; a first transistor having a base thereof connected to the junction of said resistance with said capacitor, for conduction responsive to an output from said series circuit; a second transistor having a base thereof connected to said first transistor for causing energization of said magnetic coil in response to the conduction state of said first transistor; and a limiting circuit connected to said first transistor and second transistor for limiting the excitation of said magnetic coil through said second transistor in response to the conduction state of said first transistor; wherein said magnetic coil is excited to an extent sufficient to cause engagement of said magnetic clutch during charging of said capacitor of said series circuit after closing of said starting switch, and is excited to a lesser extent but sufficient to maintain the engagement of said magnetic clutch after saturation of said capacitor.

The above and other objects, features and advantages of the invention will be more apparent upon reading the ensuing detailed description taken in connection with the accompanying drawings.

DETAILED DESCRIPTION

Figure 1:
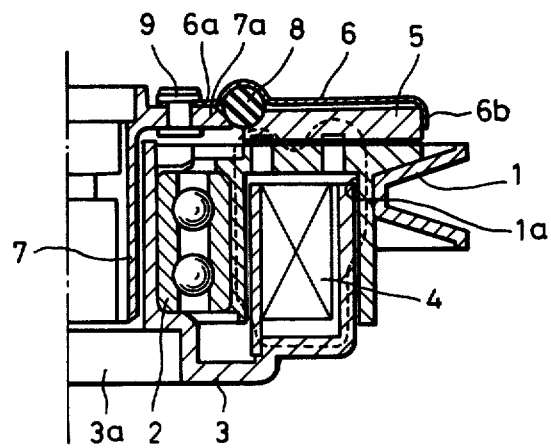
FIG. 1 is a schematic longitudinal sectional fragmentary view of a magnetic clutch to which the invention is applicable.

Referring now to the drawings, FIG. 1 illustrates the essential part of a magnetic clutch in general which is adapted to be mounted on a refrigerant compressor for air conditioning systems for automotive vehicles. Reference numeral 3 designates a stationary member which is to be fixed to a corresponding fixing portion of a refrigerant compressor, not shown. The stationary member 3 has a cylindrical central portion 3a through which the main shaft, not shown, of the compressor extends, which serves as a driven member. The magnetic clutch has a boss 7 adapted to be secured on the above main shaft and supporting a clutch plate 5. A pulley 1, which serves as a driving member, is supported on the cylindrical central portion 3a via a bearing 2 fitted around the outer periphery of the central portion 3a. The above clutch plate 5 is disposed close to a side surface of the pulley 1 which has the other side surface formed with an annular groove 1a in which a magnetic coil 4 is fitted in a manner supported by the stationary member 3. The boss 7 has a flange 7a formed integrally therewith, by which is supported a plate spring 6 at its end 6a by means of a rivet 9. The plate spring 6 has the other end 6b connected to the outer periphery of the clutch plate 5, with an elastic member 8 interposed between the flange 7a and the clutch plate 5.

With the above arrangement, upon energization of the magnetic coil 4, a magnetic flux is developed as shown by the dotted line in FIG. 1, and the clutch plate 5 is displaced against the force of the plate spring 6 due to electromagnetic force then produced, into frictional engagement with the side surface of the pulley 1 which is opposite thereto, so that driving force is transmitted from the pulley 1 which is coupled to a driving source such as a vehicle engine for rotation thereby by means of an endless belt, not shown, to the main shaft of the refrigerant compressor via the clutch plate 5 and the boss 7.

Figure 2:
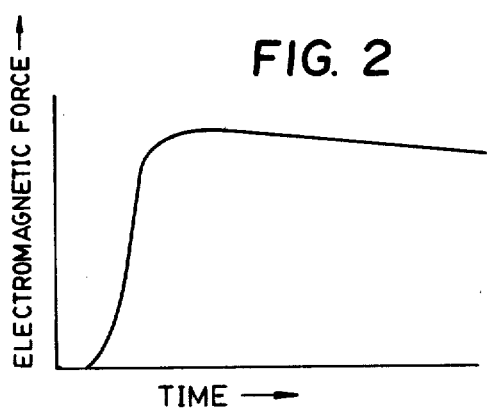
FIG. 2 is a graph showing the electromagnetic force characteristic of the magnetic coil of a conventional magnetic clutch.
Figure 3:
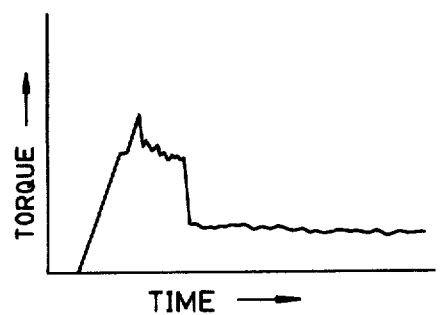
FIG. 3 is a graph showing the torque transmission characteristics of a conventional magnetic clutch on and after engagement of the clutch.

In the magnetic clutch described above, the magnitude of electric current flowing through the magnetic coil 4 is such that after engagement of the clutch its value slightly drops due to an increase in the resistance of the coil which is heated by the electric current. Accordingly, magnetomotive force or electromagnetic force is produced in the magnetic coil at a rate substantially constant with respect to time after engagement of the clutch, as shown in FIG. 2. The torque, which is transmitted from the pulley 1 to the boss 7, is large at the instant of engagement of the clutch, whereas it is kept at a small but substantially constant value after engagement of the clutch, as shown in FIG. 3.

This means that a large electromagnetic force is required at the instant of engagement of the clutch, whereas a small electromagnetic force suffices for the clutch to keep its engagement after engagement of the clutch. However, in the conventional arrangement, even after engagement of the clutch the magnetic coil 4 is constantly kept in a state energized by electromagnetic force at substantially the same rate as that at the instant of engagement of the clutch, which invites waste of electric power supplied from the battery or the like which is used as the power source.

Embodiments of the present invention will now be described with reference to FIGS. 4 through 7.

Figure 4:
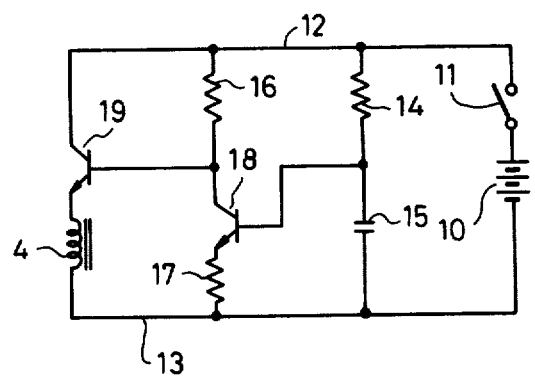
FIG. 4 is a circuit diagram showing a driving circuit for magnetic clutches, according to one embodiment of the invention.
Figure 5:
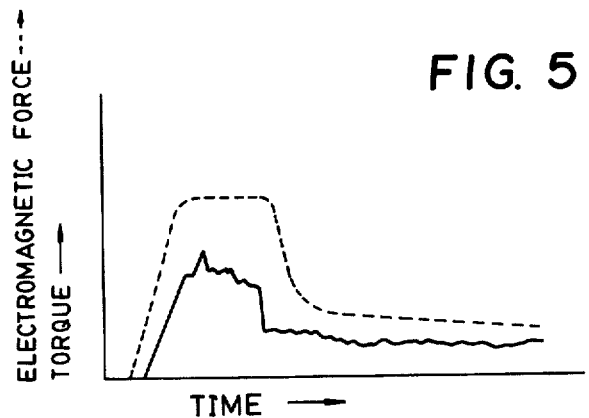
FIG. 5 is a graph showing the operating characteristic of the circuit in FIG. 4.

FIG. 4 illustrates a first embodiment of the invention. Connected to a power source 10 which comprises a battery or the like are a positive conductor 12 and a negative conductor 13 by way of a starting switch 11 which is kept in its closed position during engagement of the clutch. Connected between the two conductors 13, 14 is a series circuit with a predetermined time constant, which comprises a resistance 14 and a capacitor 15. Further connected between the conductors 13, 14 are another series circuit comprising resistances 16, 17 and an NPN transistor 18 having its collector and emitter connected to the resistances 16, 17, respectively, and a further series circuit comprising the magnetic coil 4 of a magnetic clutch and an NPN power transistor 19 having its collector connected to the positive conductor 12 and its emitter to the magnetic coil 4, respectively, the two series circuits being arranged in parallel with each other. The power transistor 19 has its base connected to the collector of the transistor 18 which in turn has its base connected to the junction of the resistance 14 with the capacitor 15.

With the FIG. 4 arrangement, to cause the magnetic clutch to engage, the switch 11 is closed to cause the capacitor 15 to charge through the resistance 14. Until the capacitor 15 is saturated with charge, the base voltage of the transistor 18 is low enough to keep the transistor 18 in the nonconducting state. Accordingly, the base voltage of the power transistor 19 is high enough to keep the transistor 19 in conduction so that the magnetic coil 4 is kept in an energized state. In this coil-energized state, the amount of current flowing through the magnetic coil 4 is determined by the value of the resistance 16. As indicated by the dotted line in FIG. 5, the resistance 16 is set at such a value that sufficiently high electromagnetic force is produced in the magnetic coil 4 upon closing the switch 11, to bring about frictional engagement of the clutch plate 5 with the pulley 1. After the capacitor 15 has been saturated with charge, the transistor 18 has its base voltage elevated to such a level as to cause the transistor 18 to conduct. Upon conduction of the transistor 18, the base voltage of the power transistor 19 drops to a divided voltage at the junction of the resistance 16 with the resistance 17 so that the current, which is supplied to the magnetic coil 4 through the power transistor 19, is reduced and accordingly the electromagnetic force produced in the coil 4 is correspondingly reduced as indicated by the dotted line in FIG. 5.

In the above-mentioned manner, upon closing the switch 11, there occurs a large current flow through the magnetic coil 4 to cause the coil 14 to produce electromagnetic force by which the clutch plate 5 is brought into frictional engagement with the pulley 1. After the lapse of a predetermined period of time which is determined by the time constant of the circuit of resistance 14 and capacitor 15, the current flowing through the magnetic coil 4 is reduced to a lower value which is however still sufficient to cause the coil 4 to produce an electromagnetic force of a magnitude corresponding to the transmission torque indicated by the solid line in FIG. 5 and sufficient to keep the frictional engagement of the clutch plate 5 with the pulley 1.

The above-mentioned predetermined period of time, which lasts from the start of engagement of the magnetic clutch to the start of reduction of current flowing through the magnetic coil 4, ranges from 0.3 sec. to 1.0 sec., for instance, in the case of a magnetic clutch which is used in a vane compressor having a discharge rate of from 140 cc to 170 cc per revolution of the rotor.

On the other hand, to cause disengagement of the magnetic clutch, the switch 11 is opened, and accordingly the circuit formed of the positive conductor 12, the power transistor 19, the magnetic coil 4 and the negative conductor 13 is shut off from the power source 10 to cause the magnetic coil 4 to be deenergized. Consequently, the clutch plate 5 is detached from the pulley 1 and moves into its original position by the force of the plate spring 6, to thus release the pulley 1 from its rotative engagement with the boss 7. On this occasion, the charge on the capacitor 15 is discharged to the negative conductor 13 via the base and emitter of the transistor 18.

Figure 6:
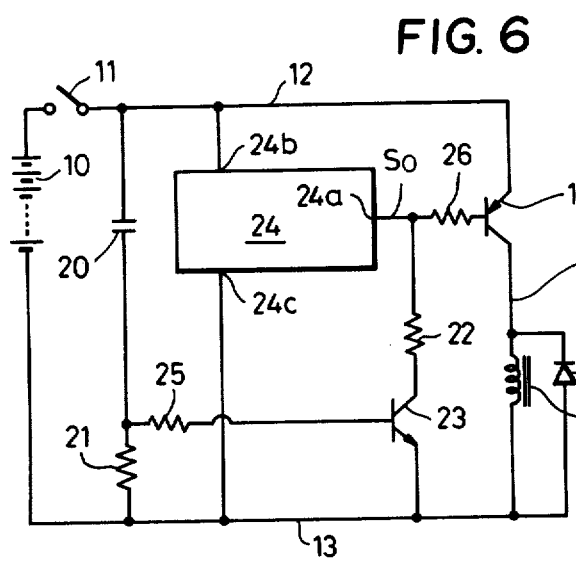
FIG. 6 is a circuit diagram showing a driving circuit for magnetic clutches, according to another embodiment of the invention.

FIG. 6 illustrates another embodiment of the present invention. A series circuit with a predetermined time constant comprising a capacitor 20 and resistances 21, 25 is connected between a positive conductor 12 and a negative conductor 13, both of which are connected to a power source 10 by way of a starting switch 11, the junction of the capacitor 20 with the resistance 21 being connected to the bae of an NPN transistor 23 by way of the resistance 25. The transistor 23 has its collector connected to the base of an NPN power transistor 19' by way of a resistance 22 and its emitter to the negative conductor 13, respectively. The power transistor 19' has its collector connected to one end of a magnetic coil 4 which has its other end connected to the negative conductor 13, its emitter to the positive conductor 12 and its base to the output terminal 24a of an oscillator 24 by way of a resistance 26, respectively. The oscillator 24 has its power supply terminal 24b connected to the positive conductor 12, and its ground terminal 24c to the negative conductor 13, respectively. Thus, the power transistor 19' turns on or off in response to output pulses from the oscillator 24 and the on and off states of the transistor 23, to cause the magnetic coil 4 to be energized or deenergized. In FIG. 6, reference numeral 27 designates a diode 27 which is connected in parallel to with magnetic coil 4 to protect it from being damaged by counter electromotive force which is produced in the coil 4 when it is deenergized.

Figure 7:
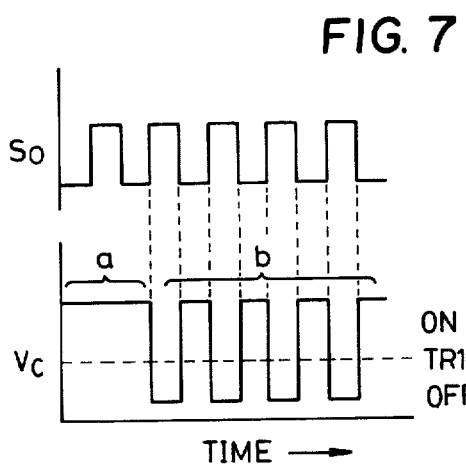
FIG. 7 is a graph showing the driving pulses for magnetic clutches which is obtainable by the circuit in FIG. 6.

With the FIG. 6 arrangement, when the switch 11 is closed in order to obtain engagement of the magnetic clutch, the oscillator 24 is activated to constantly produce a pulse signal So with a predetermined pulse repetition period and a predetermined pulse width, as shown in FIG. 7. Upon closing the switch 11, the capacitor 20 starts to charge. Until the capacitor 20 becomes saturated with charge, the base voltage of the transistor 23 is high enough to hold the transistor 23 in conduction so that the base voltage of the power transistor 19' is low enough to hold the power transistor 19' in the nonconducting state, thus holding the magnetic coil 4 in an energized state. More specifically, as shown by the symbol a in FIG. 7, the voltage Vc applied to the magnetic coil 4 connected to the collector of the power transistor 19' is kept high upon clutch engaging action a so that large electromagnetic force is produced in the magnetic coil 4 to bring the clutch plate 5 into frictional engagement with the pulley 1. When the capacitor 20 is saturated after the above frictional engagement of the clutch plate 5 with the pulley 1 (i.e., after the lapse of 0.3-1.0 sec. after the start of clutch engaging action, as previously mentioned), the transistor 23 has its base voltage lowered to come into the nonconducting state. After this, the output pulse signal So alone of the oscillator 24 is applied to the base of the power transistor 19' to cause it to conduct intermittently as shown by the symbol b in FIG. 7 so that the current flowing through the magnetic coil 4 is effectively reduced. Thus, electromagnetic force is produced in the magnetic coil 4 at a reduced rate, resulting in a reduction in the power consumption by the magnetic coil 4 to a minimum value required for keeping the frictional engagement of the clutch plate 5 with the pulley 1.

As previously noted, after the lapse of the predetermined period of time from the start of clutch engaging action, the magnetic coil 4 is intermittently energized by means of the power transistor 19' which is then responsive to the output pulses So alone from the oscillator 24. On this occasion, the pulse duty factor of the output signal So should be set to about 70 percent.

Obviously many modifications and variations of the present invention are possible in the light of the above teachings. It is therefore to be understood that within the scope of the appended claims the invention may be practiced otherwise than as specifically described.

What is claimed is:

1. A driving circuit for a magnetic clutch adapted for use with a refrigerant compressor, the magnetic clutch being of the type including a clutch plate arranged close to a driving member and fixed to a main shaft provided in said refrigerant compressor, and a magnetic coil operable upon energization thereof to cause frictional engagement of said clutch plate with said driving member, said driving circuit comprising: a starting switch connected to a power source; a series circuit comprising a resistance and a capacitor and having a predetermined time constant, said resistance and capacitor being arranged to be energized upon closing of said starting switch; a first transistor having a base thereof connected to the junction of said resistance with said capacitor, for conduction responsive to an output from said series circuit; a second transistor having a base thereof connected to said first transistor for causing energization of said magnetic coil in response to the conduction state of said first transistor; and a limiting circuit connected to said first transistor and second transistor for limiting the excitation of said magnetic coil through said second transistor in response to the conduction state of said first transistor; wherein said magnetic coil is excited to an extent sufficient to cause engagement of said magnetic clutch during charging of said capacitor of said series circuit after closing of said starting switch, and is excited to a lesser extent but sufficient to maintain the engagement of said magnetic clutch after saturation of said capacitor.

2. The driving circuit as claimed in claim 1, wherein said limiting circuit includes a second series circuit arranged in parallel with said first-mentioned series circuit, said second series circuit comprising a pair of resistances, said second transistor having said base thereof connected to the junction between said pair of resistances; and wherein said first transistor has a collector and emitter thereof connected to said second series circuit for causing a change in voltage at the junction between said pair of resistances in response to the conduction state thereof.

3. The driving circuit as claimed in claim 1, wherein said limiting circuit includes an oscillator, said oscillator having an output terminal thereof connected to the base of said second transistor and adapted to produce pulses with a predetermined pulse duty factor, and a resistance connected to the junction of said second transistor with said oscillator; and wherein said first transistor has a collector and emitter thereof connected in series with said last-mentioned resistance for causing a change in voltage at the base of said first transistor in response to the conduction state thereof.

4. A driving circuit for a magnetic clutch adapted for use with a refrigerant compressor, the magnetic clutch being of the type including a clutch plate arranged close to a driving member and fixed to a main shaft provided in said refrigerant compressor, and a magnetic coil operable upon energization thereof to cause frictional engagement of said clutch plate with said driving member, said driving circuit comprising: a starting switch connected to a power source; a first series circuit comprising a first resistance and a capacitor and having a predetermined time constant, said first resistance and capacitor being arranged to be energized upon closing of said starting switch; a first transistor having a base thereof connected to the junction of said first resistance with said capacitor, for conduction responsive to an output from said first series circuit; a second series circuit arranged in parallel with said first series circuit, said second series circuit comprising a second resistance and a third resistance, said first transistor having a collector and emitter thereof connected in series with said second resistance and third resistance for causing a change in voltage at the junction of said second resistance with said third resistance in response to the conduction state thereof; and a second transistor having a base thereof connected to the junction of said second resistance with said third resistance of said second series circuit and a collector and emitter thereof in series with said magnetic coil, respectively, and operable to energize said magnetic coil; wherein said magnetic coil is excited to an extent sufficient to cause engagement of said magnetic clutch during charging of said capacitor of said first series circuit after closing of said starting switch, and is excited to a lesser extent but sufficient to maintain the engagement of said magnetic clutch after saturation of said capacitor.

5. A driving circuit for a magnetic clutch adapted for use with a refrigerant compressor, the magnetic clutch being of the type including a clutch plate arranged close to a driving member and fixed to a main shaft provided in said refrigerant compressor, and a magnetic coil operable upon energization thereof to cause said frictional engagement of said clutch plate with said driving member, said driving circuit comprising: a starting switch connected to a power source; a series circuit comprising a first resistance and a capacitor and having a predetermined time constant, said first resistance and capacitor being arranged to be energized upon closing of said starting switch; a first transistor having a base thereof connected to the junction of said first resistance with said capacitor, for conduction responsive to an output from said series circuit; a second transistor having a collector and emitter thereof connected in series with said magnetic coil for energizing same; an oscillator having an output terminal thereof connected to the base of said second transistor and adapted to produce pulses with a predetermined pulses duty factor; and a second resistance connected to the junction of said second transistor with said oscillator; said first transistor having a collector and emitter thereof connected in series with said second resistance for causing a change in voltage at the base of said second transistor in response to the conduction state thereof; wherein said magnetic coil is excited to an extent sufficient to cause engagement of said magnetic clutch during charging of said capacitor of said series circuit after closing of said starting switch, and is excited to a lesser extent but sufficient to maintain the engagement of said magnetic clutch after saturation of said capacitor.

* * * * *